United States Patent [19]
Grantz et al.

[11] Patent Number: 6,148,501
[45] Date of Patent: Nov. 21, 2000

[54] FABRICATION MEANS FOR IN-HUB SPINDLE WITH SEPARATE FLUID DYNAMIC BEARINGS

[75] Inventors: Alan Lyndon Grantz, Aptos; Marten Byl, Los Gatos; Matt L. Shumway; Norbert Parsoneault, both of Scotts Valley; Etoli Wolff, Sunnyvale; Hans Leuthold, Santa Cruz; Roger Allen Addy, Gilroy, all of Calif.

[73] Assignee: Seagate Technology LLC, Scotts Valley, Calif.

[21] Appl. No.: 09/060,030

[22] Filed: Apr. 14, 1998

[51] Int. Cl.[7] .................................................. G11B 5/127
[52] U.S. Cl. .................................. 29/603.03; 29/407.01; 29/596; 29/898.07; 29/898.09
[58] Field of Search ................................ 29/603.03, 593, 29/596, 407.01, 898.07, 898.09

[56] References Cited

U.S. PATENT DOCUMENTS

| | | | |
|---|---|---|---|
| 3,797,081 | 3/1974 | Buzzi | 29/38 C |
| 4,043,612 | 8/1977 | Orcutt | 308/9 |
| 4,295,268 | 10/1981 | Punshon et al. | 29/596 |
| 4,395,077 | 7/1983 | Wong | 308/189 A |
| 4,677,509 | 6/1987 | Nishida et al. | 360/97 |
| 4,753,706 | 6/1988 | Vezirian | 156/294 |
| 4,919,547 | 4/1990 | Schwartzman | 384/110 |
| 4,928,029 | 5/1990 | Wright | 310/89 |
| 4,998,033 | 3/1991 | Hisabe et al. | 310/67 R |
| 5,001,581 | 3/1991 | Elasser et al. | 360/97.02 |
| 5,112,142 | 5/1992 | Titcomb et al. | 384/107 |
| 5,272,803 | 12/1993 | Harrison et al. | 29/596 |
| 5,283,491 | 2/1994 | Jabbar et al. | 310/90 |
| 5,497,980 | 3/1996 | Chick | 269/43 |
| 5,666,716 | 9/1997 | Parsoneault et al. | 29/596 |
| 5,697,708 | 12/1997 | Leuthold et al. | 384/110 |
| 5,758,404 | 6/1998 | Baumann et al. | 29/598 |
| 5,793,129 | 8/1998 | Parsoneault et al. | 310/42 |
| 5,831,355 | 11/1998 | Oku | 310/42 |
| 5,980,113 | 11/1999 | Grantz | 384/108 |
| 6,005,748 | 12/1999 | Heine et al. | 360/99.08 |
| 6,019,516 | 2/2000 | Leuthold et al. | 384/110 |

FOREIGN PATENT DOCUMENTS 2194603  3/1988  United Kingdom ............ F16C 32/06

*Primary Examiner*—David P. Bryant
*Assistant Examiner*—Essama Omgba
*Attorney, Agent, or Firm*—Flehr Hohbach Test Albritton & Herbert LLP

[57] ABSTRACT

A method of fabricating a spindle hub assembly (90) including precision machining critical surfaces of the hub components (60, 33) that mount onto a spindle shaft (30) and accurately locate the critical surfaces for positioning of bearing cones (35, 36) on the shaft in spaced relationship of bearing seats (34) on the hub (60, 33) to ensure stable rotation of the hub on the shaft.

20 Claims, 7 Drawing Sheets

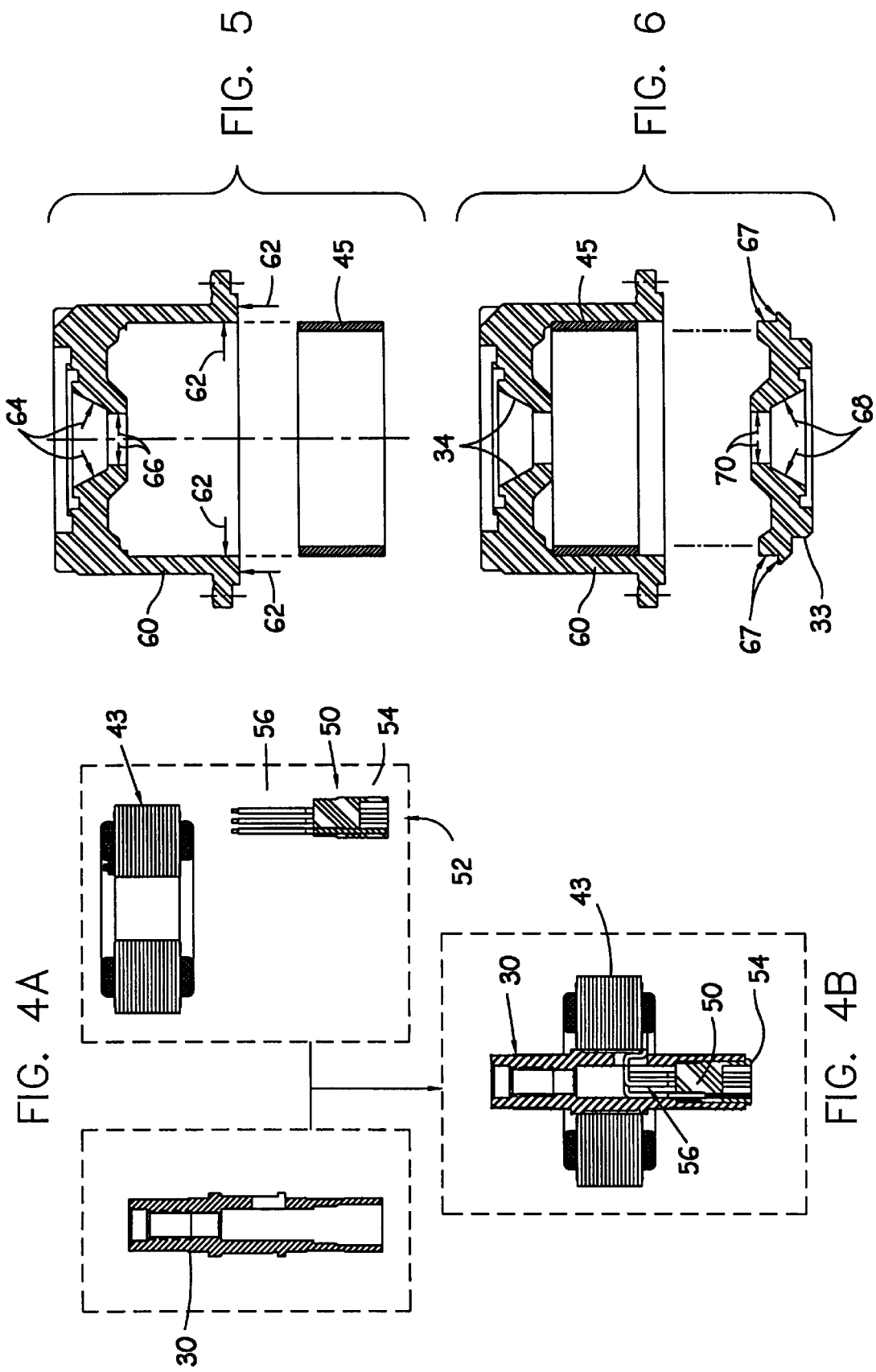

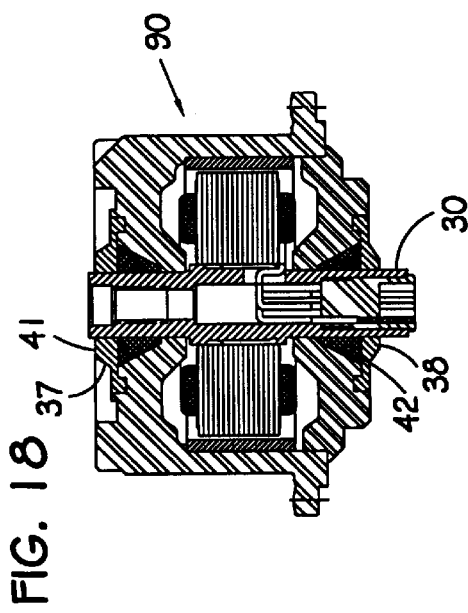
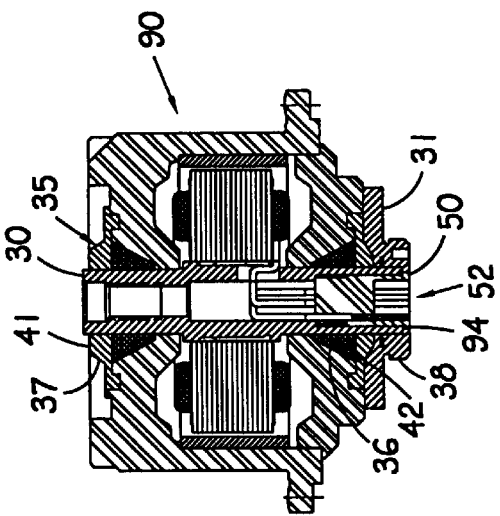
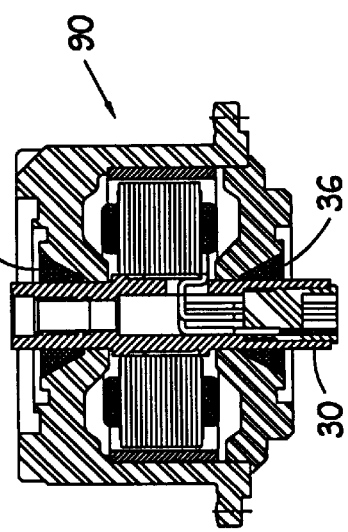
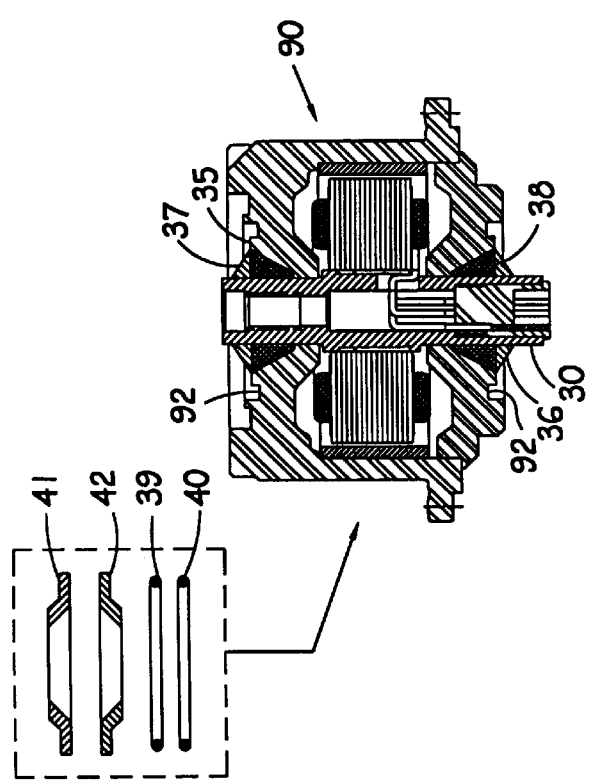

FABRICATION MEANS FOR IN-HUB SPINDLE WITH SEPARATE FLUID DYNAMIC BEARINGS

FIELD OF THE INVENTION

The present invention relates to magnetic disc drive storage systems and, more particularly, to a method of fabricating a spindle assembly for rotatably supporting magnetic disc drives so that the fluid dynamic bearing components of the spindle assembly are properly aligned for efficient operation of the fluid dynamic bearings.

BACKGROUND OF THE INVENTION

U.S. Pat. No. 5,559,651 of Grantz et al, entitled "Magnetic Disc Storage System with Hydrodynamic Bearing," discloses a spindle assembly for rotatably supporting a magnetic storage disc that utilizes fluid-dynamic bearings defined by a one-piece central bearing with spherical bearings cones, which supports a spindle hub with spherical bearing seats. The present invention is an improvement on the method of fabricating spindle assemblies of similar construction.

SUMMARY OF THE INVENTION

Briefly described, the present invention comprises a method of fabricating a spindle assembly that includes the following components: a two piece hub, a shaft, first and second opposed bearing cones, and a stator assembly. The method comprises the steps of (a) mounting the stator assembly onto the shaft, (b) inserting the shaft through an opening in a first piece of the two-piece hub, (c) positioning the second piece of the two piece hub onto the shaft opposite the stator assembly from the first piece so that the stator assembly is enclosed within the hub, (d) securing together the first and second pieces of the hub, (e) securely positioning the first bearing cone about the shaft, and (f) progressively positioning the second bearing cone along the shaft toward the first bearing cone until the gaps between the bearing surfaces of the bearing cone and the hub are within a preselected tolerance.

According to an aspect of the present invention, steps (e) and (f) include press fitting the bearing cones onto the shaft. In this manner, the bearing cones can be press fit onto the shaft until they are accurately in position relative to the bearing surfaces of the hub.

Preferably, step (d) includes joining the first and second hub pieces by means of an interference fit. An interference fit minimizes galling while ensuring a secure and precise mounting of the two hub pieces.

According to another aspect of the present invention, step (f) is performed by measuring air flow, by means of an air gauge, through the gaps in order to determine the width of the gaps. However, step (f) can also be performed by measuring the axial play between the shaft and the hub.

According to another aspect of the present invention, step (d) is performed first by precision machining critical surfaces of the hub in a single set-up process to ensure accurate location of the critical surface with respect to each other. Then, the two pieces of the hub are mounted together at their respective critical surfaces. This ensures accurate location of the critical surfaces, which are the surfaces that mate with each other to form a single hub component.

Preferably, the critical surfaces also include surfaces that engage bearing surfaces of the shaft and bearing cone, and all critical surfaces of the hub components are precision ground in one set-up process. The result of the fabrication process by this method is a hub assembly that provides split, asymmetric bearings that rotatably support a two-piece hub assembly that encloses a stator assembly secured to a fixed shaft of the spindle assembly. The manufacturing process also allows for minimum tolerances in assembly that ensure accurate positioning of the hub components relative to the bearing cones and shaft.

These and other features, objects, and advantages of the present invention will become apparent from the following description of the best mode for carrying out the invention, when read in conjunction with the accompanying drawings, and the claims, which are all incorporated herein as part of the disclosure of the invention.

BRIEF DESCRIPTION OF THE DRAWINGS

Throughout the several views, like reference numerals refer to like parts, wherein:

FIG. 4A is an exploded view of the shaft, stator, and female connector of the spindle assembly of FIG. 2;

FIG. 4B is an assembled view of the components of FIG. 4A;

FIG. 5 is an exploded view of the hub and back iron component and the magnet for the spindle assembly of FIG. 2;

FIG. 6 is an exploded view of the hub/back iron and magnet and the lower bearing seat of the spindle assembly of FIG. 2;

FIG. 16 is an assembled view of the components of FIG. 15;

FIG. 17 is an exploded view of the components of FIG. 16 and the seal cones and shield seals;

FIG. 18 is an assembled view of the components of FIG. 17; and

FIG. 19 is an assembled view of the components of FIG. 18 and flange connection.

DETAILED DESCRIPTION OF A PREFERRED EMBODIMENT

Reference will now be made in detail to the preferred embodiments of the invention, examples of which are illustrated in the accompanying drawings. While the invention will be described in conjunction with the preferred embodiments, it will be understood that the described embodiments are not intended to limit the invention specifically to those embodiments. On the contrary, the invention is intended to cover alternatives, modifications and equivalents, which may be included within the spirit and scope of the invention as defined by the appended claims.

Figure 1:
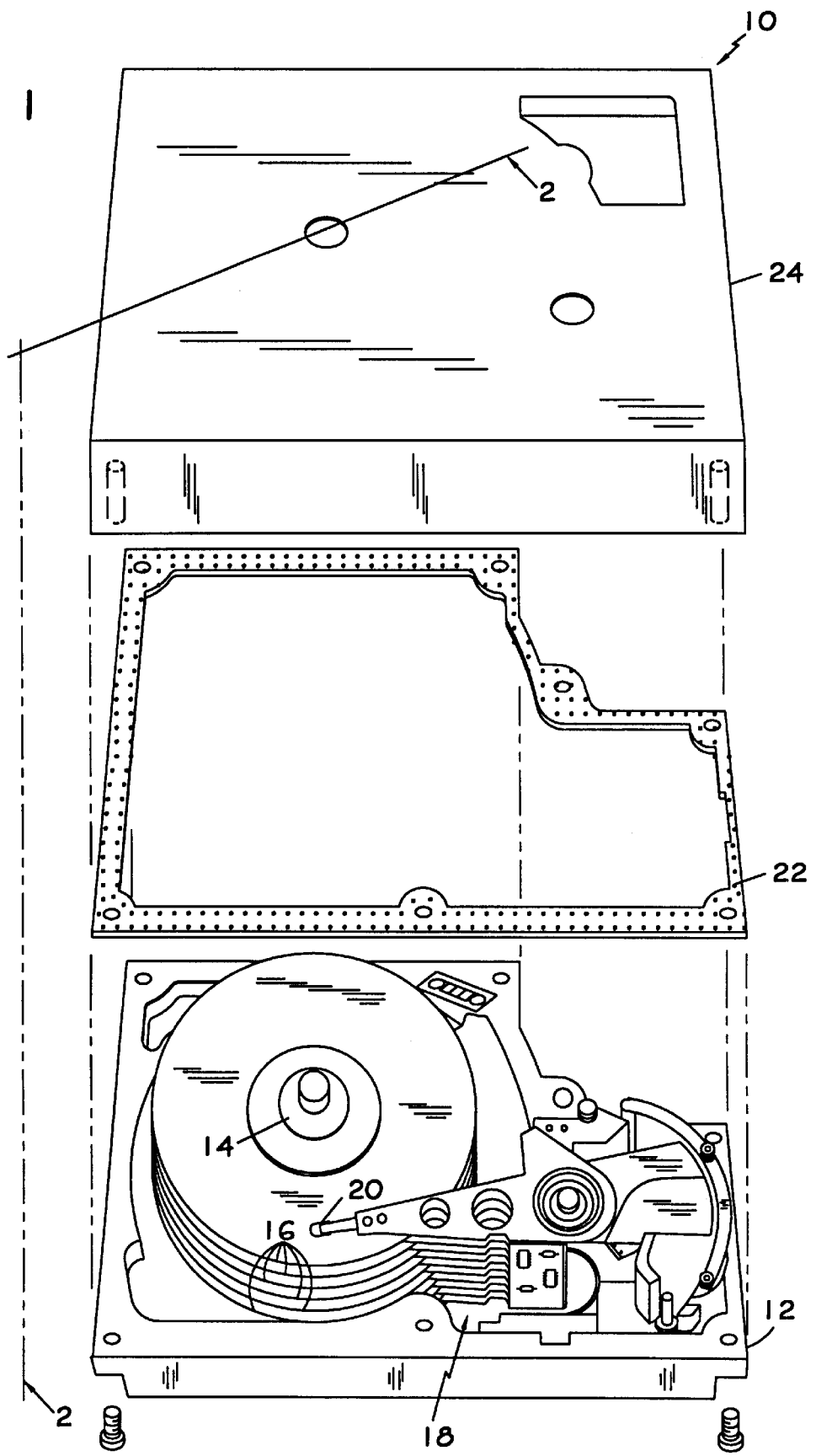
FIG. 1 is an exploded pictorial view of a magnetic disc drive storage system including a fluid dynamic bearing in accordance with the invention.

FIG. 1 is an exploded perspective view of a magnetic disc drive storage system in which the present fluid dynamic bearing could be used. In the example to be discussed below, the use of the fluid dynamic bearing will be shown in conjunction with a spindle motor. However, this bearing cartridge is not limited to use with this particular design of a disc drive, which is shown only for purposes of the example. Given the stability which this invention achieves, it could also potentially be used to support the actuator for rotation. The bearing cartridge also has numerous other uses outside the field of disc drives.

In this particular example, the storage system 10 includes a housing base 12 having spindle motor 14 which rotatably carries storage discs 16. An armature assembly 18 moves transducers 20 across the surface of the discs 16. The environment of discs 16 is sealed by seal 22 and cover 24. In operation, discs 16 rotate at high speed while transducers 20 are positioned at any one of a radially differentiated track on the surface of the discs 16. This allows the transducers 20 to read and write magnetically encoded information on the surfaces of discs 16 at selected locations. The discs rotate at very high speeds, several thousand RPM, in order to maintain each transducer flying over the surface of the associated disc. In present day technology, the spacing distance between the transducer and the rotating disc surface is measured in microinches; thus it is absolutely essential that the disc does not tilt or wobble.

Figure 2:
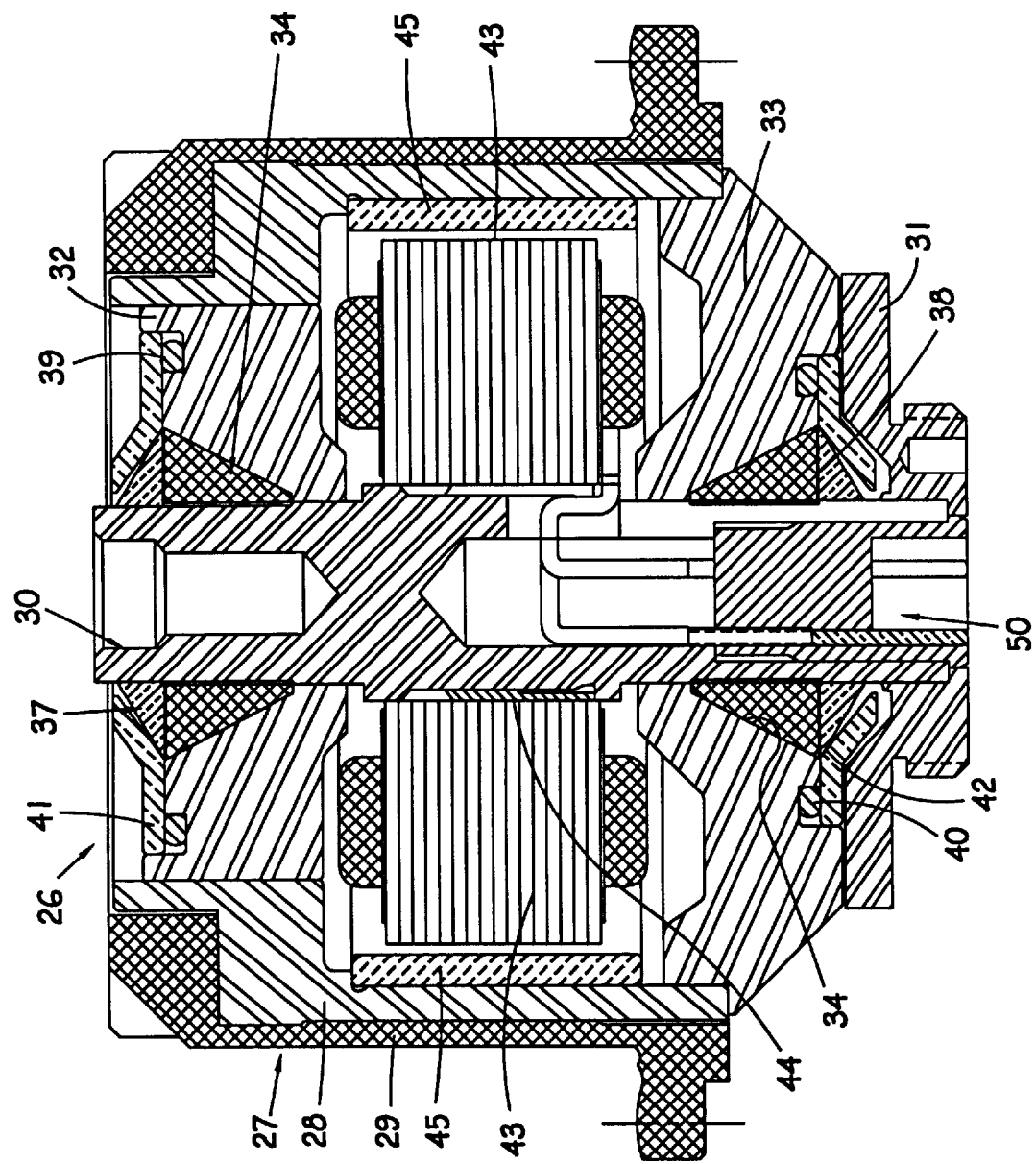
FIG. 2 is a sectional view of the spindle assembly of the present invention.
Figure 3:
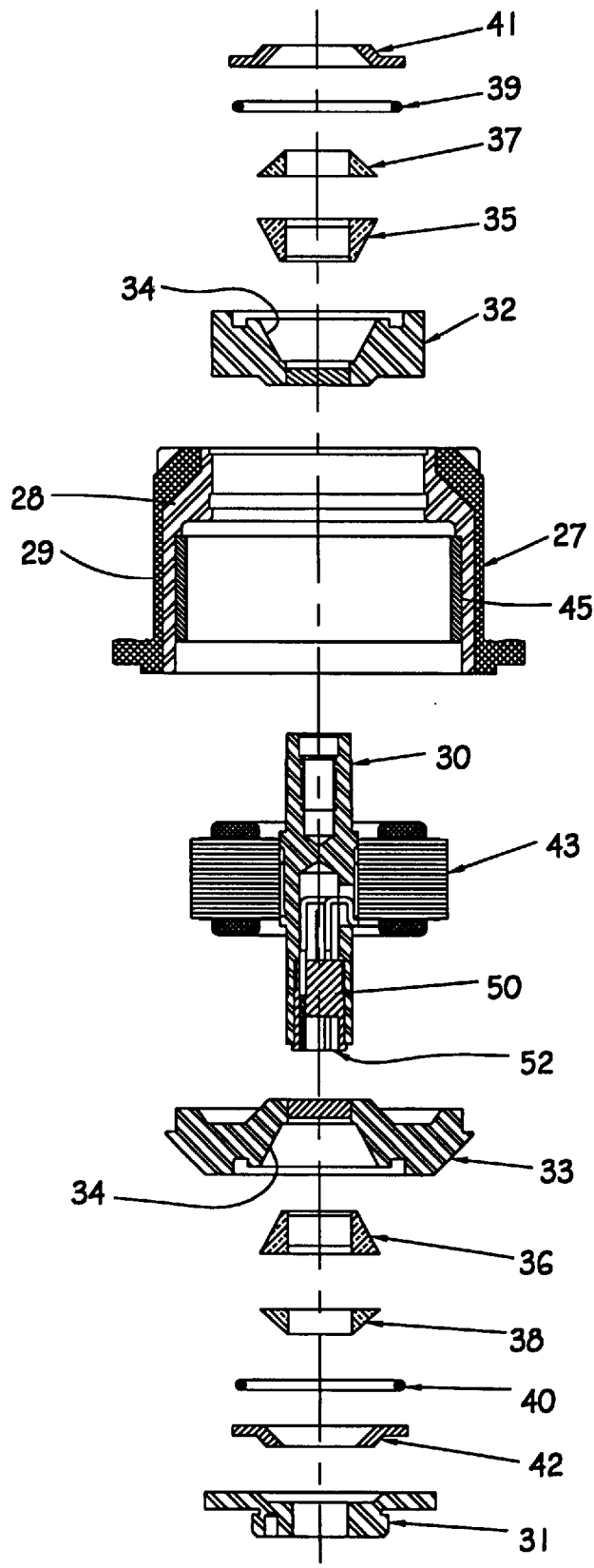
FIG. 3 is an exploded view of the spindle assembly of the present invention.

FIGS. 2 and 3 show the design of a bearing cartridge 26 that is part of the spindle motor identified in FIG. 1. Bearing cartridge 26 supports a spindle hub assembly 27, which is comprised of an upper hub back iron 28 and a top hub cover 29. Bearing cartridge 26 includes a central spindle shaft 30 that is press fit within a bottom mounting flange 31 and which is threadably secured to base 12. Bearing cartridge also includes an upper bearing seat 32 and a lower bearing seat 33, which both include conical bearing surfaces 34. Bearing surfaces 34 engage a pair of bearing cones 35, 36, which are identical and are discussed in more detail later.

Bearing cartridge 26 also includes upper and lower seal cones 37, 38, seal O-rings 39, 40, and shield seals 41, 42. Seal cones 37, 38 are press fit onto spindle shaft 30 and shield seals 41, 42 are press fit onto bearing seats 32, 33.

The spindle motor includes a stator with windings 43, which are secured about spindle shaft 30 by means of a clip 44, and magnets 45, which are secured to back iron 28.

An electrical connector assembly 50 is mounted within the lower end of spindle shaft 30 and includes electrical leads that are connected to the electrical windings of stator 43. Connector assembly 50 also includes connector pins 52, which provide for reception of a connector from an electrical power source.

Referring to FIGS. 4A, 4B, the first step in the method of fabricating the spindle assembly of the present invention comprises the fabrication of the male connector, which is discussed in more detail in the concurrently filed patent application entitled "Low Profile, In-Shaft Connector", inventors Alan L. Grantz, Marten F. Byl and Gary A. Treleven, attorney docket no. A-65482, which is incorporated herein.

Then the fabricated male connector 50 is press fit into the lower end of the spindle shaft 30 until its flange 54 is flush with the lower edge of the shaft. The stator assembly 43 is then press fit onto the central portion of shaft 30. The stator of the motor assembly can be attached to the shaft with a grounding clip to provide electrical contact therewith and thereby ensure the electrical integrity of the stator assembly. Prior to final securing of the stator 43 onto the shaft 30, the electrical leads 56 are connected to the electrical windings of the stator. The assembled components are shown in FIG. 4B.

As shown in FIG. 5, the preferred form of the hub comprises a single, integral hub and back iron piece formed as shown, which is designated 60. However, a two-piece hub and back iron can also be used. As a single unit in the preferred embodiment, the lower edges of the hub, designated by arrows 62, the bearing seat surface, designated by arrows 64, and the shaft opening 66 become the critical surfaces where tolerances must be minimized to ensure proper operation of the fluid dynamic bearings of the spindle assembly. If hub 60 were a three piece component, then there would be additional critical surfaces where the second and third pieces are joined. Surfaces 62, 64, 66 are precision machined in a separate single set-up process after fabrication of the hub piece to ensure that these surfaces are properly formed and located with respect to each other. First, hub 60 is fabricated using general machining techniques. Then, surfaces 62, 64, 66 are precision machined while the hub is held in position, ensuring that surfaces 62, 64, 66 are accurately located.

FIG. 6 shows the critical surfaces 67, 68, 70 of the lower bearing seat 33 that, like the critical surfaces of the hub, must be precision machined in a separate process to ensure accurate dimensions. The operation of the fluid dynamic bearings is discussed in more detail in concurrently filed patent application entitled "Asymmetric Sealing Means for Fluid Dynamic Bearing," inventor Alan L. Grantz, attorney docket no. A-65483. To achieve efficient operation of fluid dynamic bearings, it is critical that the dimensions between the bearing cone and the bearing seat 34 be within a narrow range of tolerances. The surfaces 62, 67 where the lower bear seat and the hub are joined fix the relative positions of the bearing seat surfaces that support the bearing cone, and of course the bearing seat surfaces 64, 68 must be accurately machined to form a uniform conical bearing seat.

It is an important aspect of the present invention that the contact surface of the components that comprise the fixed shaft and rotating hub assembly be accurately located in order to ensure stable rotation of the hub. The method of the present invention sets these critical surfaces by precision machining in a separate process and does so for all critical surfaces on each component during one set-up.

Figure 7:
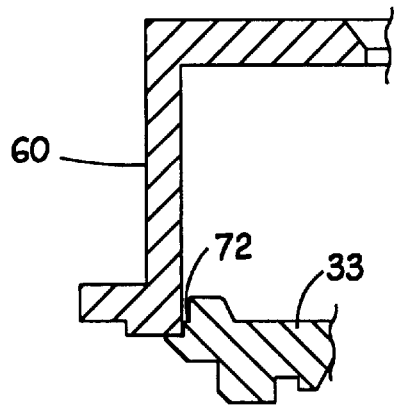
FIG. 7 is an enlarged view of the joint between the hub and lower bearing seat.
Figure 8:
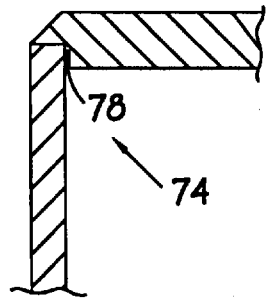
FIG. 8 is an enlarged view of an alternative design for a two-piece hub.
Figure 9:
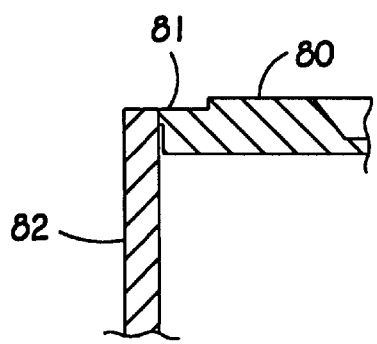
FIG. 9 is an enlarged view of a third design for a two-piece hub.

FIGS. 7–9 show three different methods for forming the hub and bearing seat connections. Each method has in common with the others the use of an interference fit. In FIG. 7, lower bearing seat 33 is formed with a relatively small step 72, which during press fitting of lower bearing seat 33 onto hub 60 minimizes galling between the two parts while still allowing a press fit to ensure concentricity. The gaps between the lower bearing seat and the hub are shown exaggerated in FIG. 7 in order to illustrate step 72.

FIG. 8 shows an interference fit design for a two-piece hub 74, wherein the hub includes an upper bearing seat 76 that itself has a small step 78. FIG. 9 shows an interference fit design where the upper bearing seat 80 with a step 81 sits flush with a separate back iron 82. Others designs should be apparent to those skilled in the art of magnetic disc drive systems and the present invention is not meant to be limited to a one-piece or two-piece hub, or two any particular design for the hub, aside from its hollow interior and opposed bearing seats.

Figure 10:
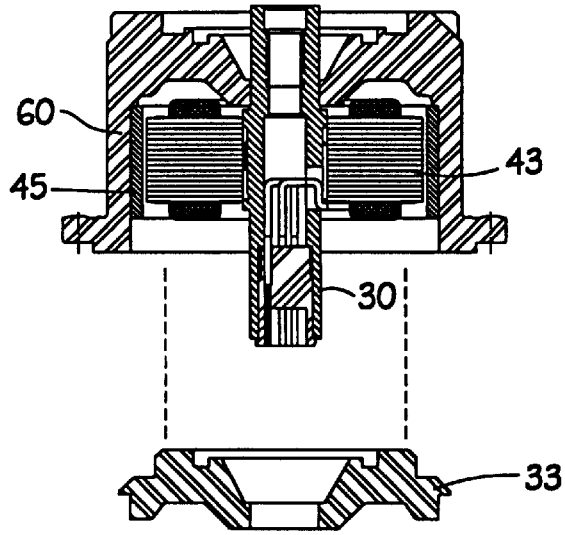
FIG. 10 is an assembled view of the hub, stator and shaft.
Figure 11:
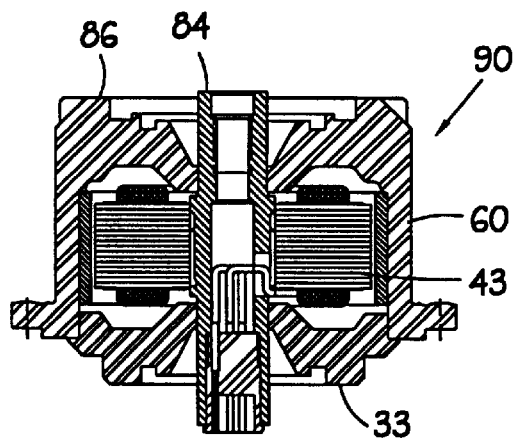
FIG. 11 is an assembled view of the hub, stator, shaft and lower bearing seat.

FIG. 10 shows the stator assembly 43 and shaft 30 inserted into the hub 60, with the magnets 45 secured within the hub but with the lower bearing seat 33 not yet secured to the lower edge of the hub. The shaft 30 and stator assembly 43 are loosely held within the hub 60 while the lower bearing seat 33 is press fit onto the hub 60, as shown in FIG. 11. The assembled hub and shaft is referred to as the spindle assembly 90. The relative axial positions of the shaft and the hub are maintained by controlling the positions of the upper end 84 of the shaft and the top side 86 of the hub.

Figure 12:
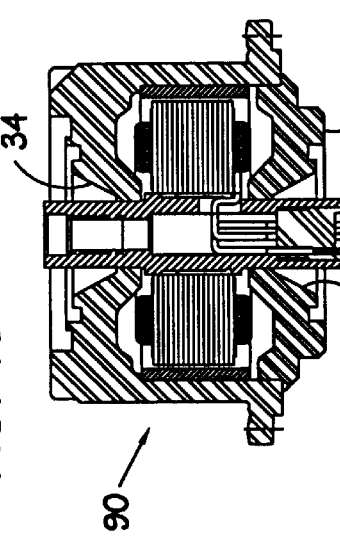
FIG. 12 is an exploded view of the assembled components of FIG. 11 and the lower bearing cone.

FIG. 12 shows the lower bearing cone 36 exploded from the assembled spindle assembly 90. Both the lower and upper bearing cones have their inside diameter surface 91 and their outside diameter surface 93 precision machined in one set-up process to ensure accurate angular alignment of these surfaces.

Figure 14:
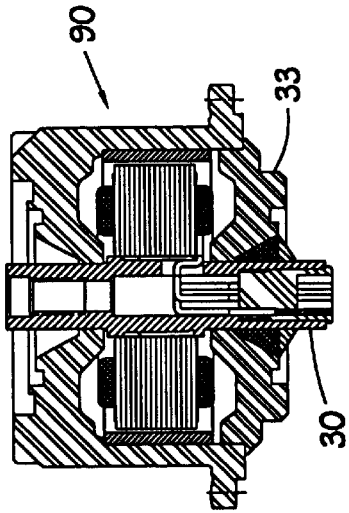
FIG. 14 is an assembled view of the components of FIG. 12.
Figure 13:
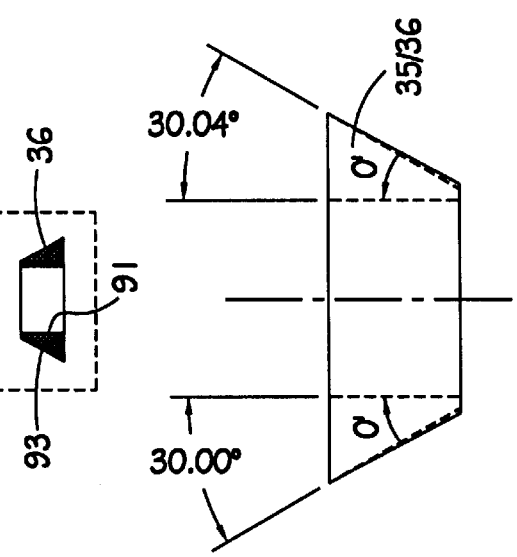
FIG. 13 is a schematic diagram illustrating the shape a bearing cone before and after being press fit on the shaft.

Once precision machined, lower bearing cone 36 is press fit onto the lower end of the shaft to a position approximate its desired location. When the bearing cones 35, 36 are press fit onto the shaft 30, they tend to distort or flex somewhat due to the narrower width of the cones at their inner ends. As a result, the cone angle θ between the bearing surface of bearing seats 34 and the inside surface of the cone decreases a slight amount. For example, a bearing cone with a cone angle of 30.04° has been found to distort to the point that its cone angle is approximately 30.00°. Since 30.00° is the desired cone angle, the bearing cones are machined initially with a 30.04° cone angle. This is represented in FIG. 13 where in phantom is shown cone angle θ before press fitting the bearing cone onto the shaft and in solid line is shown the cone angle θ' after press fitting. FIG. 14 shows the lower bearing cone 33 fully press fit onto the shaft 30.

Figure 15:
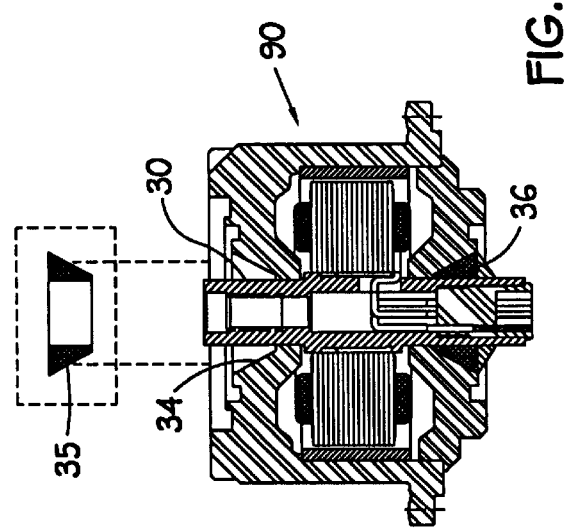
FIG. 15 is an exploded view of the components of FIG. 14 and the upper bearing cone.

Then the upper bearing cone 35 is mounted As shown in FIG. 15, the upper bearing cone 35 is press fit onto the upper end of the shaft 30 and the gap between the opposed surfaces of the bearing cones 35, 36 and bearing seats 34 is measured. Measurement can be made by gauging air flow between the bearing surfaces or by gauging linear displacement of the shaft. For a desired gap of 0.005 mm, the play between the shaft and the hub will be four times this gap, or 0.02 mm, due to the 30° angle of the bearing seat. FIG. 16 shows both upper and lower bearing cones properly press fit onto the shaft.

FIG. 17 shows the seal cones 37, 38 press fit onto the shaft 30 and the shield seals 41, 42 and O-ring seals 39, 40 exploded from shaft 30. After the seal cones 37, 38 are mounted, O-ring seals 39, 40 are placed into the annular channel 92 around the bearing seats 34 and then the shield cones 41, 42 are secured about the seal cones 37, 38, as shown in FIG. 18. The shield cones 41, 42 and seal cones 37, 38 are discussed in more detail in concurrently filed patent application entitled "Centrifugal Capillary Seal," inventors Alan L. Grantz and Mohamed M. Rahmen, attorney docket no. A-65481.

Finally, as shown in FIG. 19, the mounting flange 31 is press fit onto the lower end 94 of the shaft 30 flush with the lower end of the connector 50 and with the three pins 52 extending out the bottom of the assembly for connection to a female connector associated with an electrical power source.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto when read and interpreted according to accepted legal principles such as the doctrine of equivalents and reversal of parts.

What is claimed is:

1. A method of fabricating a spindle assembly that includes the following components: a two piece hub, each piece of the hub defining one of two opposing bearing surfaces of a conical hydrodynamic bearing, a shaft, first and second opposed bearing cones each having a second bearing surface of the conical hydrodynamic bearing, and a stator assembly, comprising the steps of (a) mounting the stator assembly onto the shaft,
   (b) inserting the shaft through an opening in a first piece of the two-piece hub,
   (c) positioning the second piece of the two piece hub onto the shaft opposite the stator assembly from the first piece so that the stator assembly is enclosed within the hub and the one surface of each conical hydrodynamic bearing is located at opposite ends of the hub and surrounding the shaft,
   (d) securing together the first and second pieces of the hub, after executing steps (a), (b), (c), and (d), then
   (e) securely positioning the first bearing cone about the shaft, and then
   (f) progressively positioning the second bearing cone along the shaft toward the first bearing cone until the gaps between the bearing surfaces of the bearing cone and the hub are within a preselected tolerance.

2. The method of claim 1 wherein,
   step (d) is performed first by precision machining critical surfaces of the hub in a single set-up process to ensure accurate location of the critical surfaces with respect to each other.

3. The method of claim 2 wherein,
   the two pieces of the hub are mounted together at their respective critical surfaces.

4. The method of claim 2 wherein,
   the critical surfaces also include surfaces that engage surfaces of the shaft and bearing cone, and wherein all critical surfaces of the hub components are precision machined in one set-up process.

5. The method of claim 1 wherein,
   steps (e) and (f) include press fitting the bearing cones onto the shaft.

6. The method of claim 1 wherein,
   step (d) includes joining the first and second hub pieces by means of an interference fit.

7. The method of claim 1 wherein,
   step (f) is performed by measuring, by means of an air gauge, air flow through the gaps in order to determine the width of the gaps.

8. The method of claim 1 wherein, step (f) is performed by measuring the axial play between the shaft and the hub.

9. A method of fabricating a spindle assembly that includes the following components: a two piece hub, each piece of the hub defining one of two opposing bearing surfaces of a conical hydrodvnamic bearing, a shaft, first and second opposed bearing cones each having a second bearing surface of the conical hydrodynamic bearing, and a stator assembly, comprising the steps of (a) first precision machining critical surfaces of the pieces of the hub where the two pieces are joined and where the hub engages the shaft and the bearing cones in one set up process to ensure accurate location of the critical surfaces, and thereafter (b) mounting the stator assembly onto the shaft, (b) inserting the shaft through an opening in a first piece of the two-piece hub, (c) positioning the second piece of the two piece hub onto the shaft opposite the stator assembly from the first piece so that the stator assembly is enclosed within the hub and critical surfaces of each hub piece engage each other, (d) securing together the first and second pieces of the hub and the one surface of each conical hydrodynamic bearing is located at opposite ends of the hub and surrounding the shaft, after executing steps (a), (b), (c) and (d), then (e) securely positioning the first bearing cone about the shaft, and (f) thereafter progressively positioning the second bearing cone along the shaft toward the first bearing cone until the gaps between the bearing surfaces of the bearing cone and the hub are within a preselected tolerance.

10. The method of claim 9 and further comprising the step of machining the bearing cones so that their cone angles are greater than the desired cone angle once the bearing cones are secured onto the shaft.

11. The method of claim 10 wherein the cone angles are machined to approximately 30.04°, so that once bearing cones are secured onto the shaft, the cone angle becomes 30.00°.

12. The method of claim 9 wherein, steps (e) and (f) include press fitting the bearing cones onto the shaft.

13. The method of claim 9 wherein, step (d) includes joining the first and second hub pieces by means of an interference fit.

14. The method of claim 9 wherein, step (f) is performed by measuring, by means of an air gauge, air flow through the gaps in order to determine the width of the gaps.

15. The method of claim 9 wherein, step (f) is performed by measuring the axial play between the shaft and the hub.

16. The method of claim 9 and further comprising the step of precision machining the inside diameter and outside diameter of the bearing cones on one set-up to insure accurate angular alignment.

17. A method of fabricating a spindle assembly that includes the following components: a two piece hub, each piece of the hub defining one of two opposing bearing surfaces of a conical hydrodynamic bearing, a shaft, first and second opposed bearing cones each having a second bearing surface of the conical hydrodynamic bearing, and a stator assembly, comprising (a) mounting the stator assembly onto the shaft, (b) inserting the shaft through an opening in a first piece of the two-piece hub, (c) positioning the second piece of the two piece hub onto the shaft opposite the stator assembly from the first piece so that the stator assembly is enclosed within the hub, and the one surface of each conical hydrodynamic bearing is located at opposite ends of the hub and surrounding the shaft, (d) a step for securing together the first and second pieces of the hub, (e) a step for securing the first bearing cone about the shaft, and after completing steps (a)–(e), then (f) a step for progressively positioning the second bearing cone along the shaft toward the first bearing cone until the gaps between the bearing surfaces of the bearing cone and the hub are within a preselected tolerance.

18. The method of claim 17 wherein, steps (e) and (f) include press fitting the bearing cones onto the shaft.

19. The method of claim 17 wherein, step (d) includes joining the first and second hub pieces by means of an interference fit.

20. The method of claim 17 wherein, step (f) is performed by measuring, by means of an air gauge, air flow through the gaps in order to determine the width of the gaps.

* * * * *